UNITED STATES PATENT OFFICE 2,623,895

LOWER ALKYL ESTERS OF 2-CYANO-BUTANE - 1,2,3,4 - TETRACARBOXYLIC ACIDS AND PROCESS

Gustav Steinbrunn, Schwegenheim/Pfalz, Germany

No Drawing. Application February 7, 1951, Serial No. 209,911. In Germany February 16, 1950

9 Claims. (Cl. 260—465.4)

This invention relates to a process for the production of derivatives of butane-1.2.2.3.4-pentacarboxylic acid, especially for the production of lower alkyl tetra esters of 2-cyano-1.2.3.4-tetracarboxylic acid.

I have found that said derivatives of butane pentacarboxylic acid may be obtained in a simple manner by reacting derivatives of ethylene-1.2-dicarboxylic acids or their substitution products with hydrogen cyanide in the presence of basic catalysts.

Suitable initial materials are for example the esters, amides and nitriles of maleic, fumaric, chlormaleic chlorfumaric and monoalkyl and dialkyl maleic or fumaric acids. Suitable basic catalysts are for example the alkali or alkaline earth metal salts of weak acids, as for example the carbonates, acetates or in particular the cyanides; the latter may be produced in situ in the reaction mixture by introducing alkali or alkaline earth metal hydroxide. Ammonia or amines are also suitable. The amount of the catalyst may be from about 1 to 10% of the initial material employed.

The reaction may be carried out in aqueous solution, in emulsion or in organic solvents. The reaction frequently proceeds sufficiently rapidly even at temperatures below 100° C., say as low as 45° C.; it is also possible to work in pressure vessels at higher temperatures, for example at 150° C.

The products obtained are, according to analysis, formed by the adding together of 2 molecules of the ethylene dicarboxylic acid derivative and 1 molecule of hydrogen cyanide, and are found to be derivatives of butane pentacarboxylic acid of which in each case one carboxyl group is present as a nitrile group. The formation of these compounds may be assumed to take place first by the addition of 1 molecule of hydrogen cyanide to the C=C double linkage of 1 molecule of ethylene dicarboxylic acid, and then by the addition of the resulting cyanosuccinic acid derivative in the alkaline medium to a second molecule of ethylene dicarboxylic acid with the formation of the butane pentacarboxylic acid derivative. Thus the new products have the following formula when maleic or fumaric acid ethyl ester is used as the initial material:

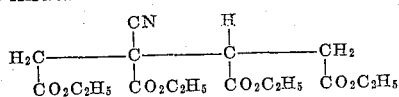

They apparently consist of a mixture of isomers, and probably stereomeric products which in some cases can be separated.

The reaction products may be converted by known methods into other derivatives, as for example into other esters or amides, into the free carboxylic acids or various salts. They are therefore valuable intermediate products, in particular for lacquer raw materials, synthetic materials, textile assistants and pharmaceutical products.

The following examples will further illustrate this invention but the invention is not restricted to these examples. The parts are by weight.

Example 1

50 parts of water and 4 parts of calcium hydroxide are added while stirring to 172 parts of fumaric acid diethyl ester; 33 parts of hydrogen cyanide are then added and the reaction mixture is heated for 2 hours at 50° C. and then for about 30 minutes at 70° to 75° C. After cooling, the whole is filtered, and the oily layer separated and distilled. The 2-cyanobutane-1.2.3.4-tetracarboxylic acid tetraethyl ester passes over as a colourless liquid at from 185° to 195° C. under a pressure of 1.1 to 1.4 millimetres (mercury gauge).

Example 2

The vapour of 33 parts of liquid hydrogen cyanide is led at 50° to 60° C. while stirring into a mixture of 144 parts of maleic acid dimethyl ester, 5 parts of potassium cyanate and 2 parts of water. The whole is slowly heated to 70° C. under reflux and kept at this temperature for 12 hours. By this time the whole of the hydrogen cyanide has been used up. The product is worked up as described in Example 1.

The cyanobutane-tetracarboxylic acid methyl ester distils over at from 185° to 189° C. under a pressure of 2 millimetres (mercury gauge). The yield is about 66% calculated with reference to the maleic acid ester.

After some time the bulk crystallises out from the distillate while the rest remains oily. After repeated recrystallisation from alcohol, the crystals have a melting point of 66° to 68° C.

Example 3

A mixture of 369 parts of maleic acid diethyl ester, 10 parts of sodium cyanide, 150 parts of dioxane and 33 parts of liquid hydrogen cyanide is heated while stirring under reflux for 36 hours at 70° to 93° C. After cooling, the whole is filtered and the dioxane is distilled off from the filtrate under reduced pressure. The residue is taken up in methylene chloride and the resulting solution washed with water and dried with anhydrous sodium sulphate. The methylene chloride is then distilled off and the residue is distilled in a high vacuum. There are thus obtained 298 parts of an oil which boils at from 180° to 182° C. under a pressure of 1.3 to 0.3 millimetres (mercury gauge) and which consists of cyanobutane tetracarboxylic acid ethyl ester. The yield is 75% calculated with reference to the maleic acid ester.

*Example 4*

A mixture of 340 parts of maleic acid di-(2-ethylhexyl) ester, 5 parts of potassium cyanide, 111 parts of dioxane and 15 parts of liquid hydrogen cyanide is heated at 70° to 90° C. for 36 hours while stirring. After cooling, the catalyst is filtered off and the dioxane is removed from the filtrate under reduced pressure. The residue, which consists of the corresponding cyanobutane tetracarboxylic acid ester, may be directly used as a softener for synthetic materials.

What I claim is:

1. A process for the production of derivatives of butane pentacarboxylic acids which consists in reacting a member of the group consisting of esters, amides and nitriles of maleic, fumaric, chloromaleic, chlorofumaric, mono- and dialkyl maleic and fumaric acids with hydrogen cyanide in the presence of basic catalysts at temperatures of up to about 150° C.

2. A process for the production of 2-cyanobutane-1.2.3.4-tetracarboxylic acid tetraethyl ester which comprises reacting fumaric acid diethyl ester with hydrogen cyanide in the presence of basic catalysts at temperatures of up to about 150° C.

3. A process for the production of 2-cyanobutane-1.2.3.4-tetracarboxylic acid tetraethyl ester which comprises reacting maleic acid diethyl ester with hydrogen cyanide in the presence of basic catalysts at temperatures of up to about 150° C.

4. A process for the production of 2-cyanobutane-1.2.3.4-tetracarboxylic tetramethyl ester which comprises reacting maleic acid dimethyl ester with hydrogen cyanide in the presence of basic catalysts at temperatures of up to about 150° C.

5. A process for the production of 2-cyanobutane-1.2.3.4-tetracarboxylic acid tetra-(2-ethylhexyl) ester which comprises reacting maleic acid di-(2-ethylhexyl) ester with hydrogen cyanide in the presence of basic catalysts at temperatures of up to about 150° C.

6. 2 - cyanobutane - 1.2.3.4 - tetracarboxylic tetramethyl ester.

7. 2 - cyanobutane - 1.2.3.4 - tetracarboxylic tetraethyl ester.

8. 2 - cyanobutane - 1.2.3.4 - tetracarboxylic tetra-(2-ethylhexyl-) ester.

9. As new compositions of matter the lower alkyl tetra esters of 2-cyanobutane-1.2.3.4-tetracarboxylic acid.

GUSTAV STEINBRUNN.

REFERENCES CITED

The following references are of record in the file of this patent:

FOREIGN PATENTS

| Number | Country | Date |
| --- | --- | --- |
| 707,852 | Germany | July 5, 1941 |

OTHER REFERENCES

Ingold et al., J. Chem. Soc. (London) vol. 119, pp. 341–354 (1921).

Ingold et al., Beilstein (Handbuch, 4th ed., 2nd Sup.), vol. 2, page 717 (1942).

Mowry, Chem. Reviews, vol. 42, pp. 226–227 (1948).